INVENTOR.
MARLIN J. HARRIS, JR.
ATTORNEY.

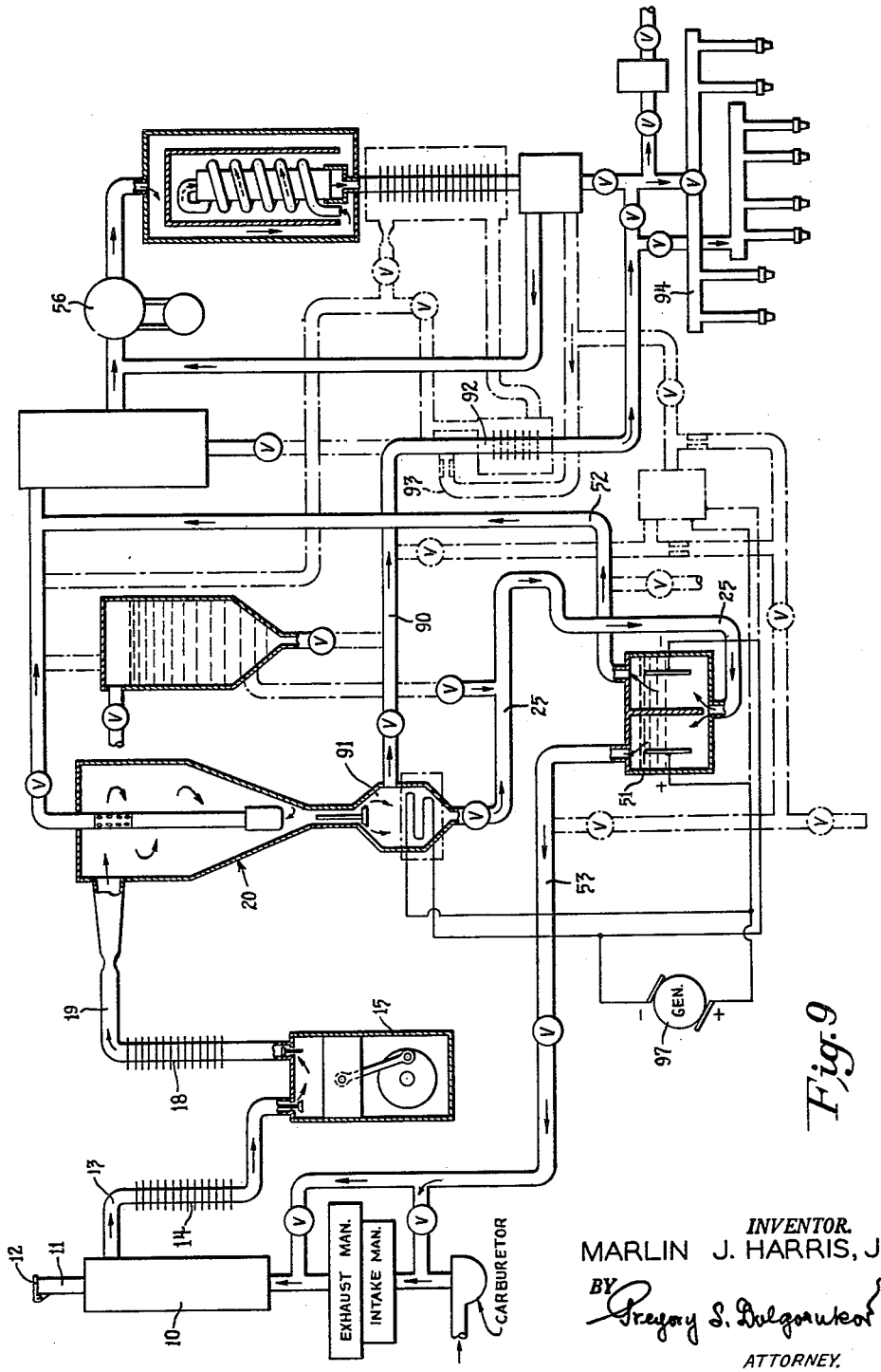

United States Patent Office 3,099,898
Patented Aug. 6, 1963

3,099,898
AGRICULTURAL PROCESS AND APPARATUS
FOR CARRYING OUT THE SAME
Marlin J. Harris, Jr., Mountain Creek, Ala.; Kate T.
Harris, administratrix of said Marlin J. Harris, Jr.,
deceased
Original application Mar. 29, 1955, Ser. No. 497,565, now
Patent No. 2,943,419, dated July 5, 1960. Divided
and this application May 5, 1960, Ser. No. 27,108
17 Claims. (Cl. 47—58)

This invention relates to the production of agricultural crops and more particularly to stimulation of crop growth and processes connected therewith, including preparation of soils, and to an apparatus for carrying out the same. This application is a division of my co-pending application, Serial No. 497,565, filed on March 29, 1955, for Agricultural Process and Apparatus for Carrying Out the Same, the latter application being a continuation-in-part of application, Serial No. 335,627, filed on February 9, 1953, for Vertical Industrialization of Crop Production Prior to Harvesting, now abandoned. Said application, Serial No. 497,565, now is Patent No. 2,943,419 issued July 5, 1960.

Within the last several decades considerable progress has been made in the production of agricultural crops on the basis of improved understanding of the nature of processes involved in the growth of plants and various processes, particularly photo-synthesis, that takes place within the system of a plant. The store of knowledge in this particular art, sometimes referred to as agricultural chemistry, enables formulation of the basic process involved in the growth of a plant as the synthesis of sugar from carbon dioxide and moisture in the tissues of living plants containing chlorophyll and with the use of energy from the sun, and liberation of some oxygen. Subsequently, such sugar is synthesized by plants into such end products as starches, fats and proteins. Qualitatively and quantitatively the end products so produced are determined by the nature of the plant, environment, conditions under which is plant is grown, and the stage of growth when harvested. This basic process is aided by various auxiliary and collateral processes determining the effectiveness and efficiency of said basic process. For instance, various nutritive mineral elements are converted by the plants into organic catalyst-enzymes-substances, which hasten the synthesis of the organic materials desired of the crop, whether it is sugar, carbohydrates, protein, cell tissue or fiber, or the enzymes themselves.

On the other hand, the basic process of animal life is sometimes considered to be reduction of starches, fats and proteins to the sugar form, and, thereupon, decomposition of sugar in a muscle tissue of animals by a mechanism not yet fully understood, again into its initial constituents such as carbon dioxide and water exhausted from the system after several intermediary processes, and with consumption of oxygen and liberation of the fixed energy in the form of heat and muscular work. Similarly to synthesis of sugar in plants taking place in the presence of catalysts, such as contained in or represented by chlorophyll, decomposition of sugar in the muscle tissue of an animal also requires presence of catalysts, still not fully understood but known to be contained in the product of insular glands of a liver, and now supplied commercially for use by diabetic persons under the name of insulin. The carbon dioxide and water are returned to the plants through many channels for completion of the cycle. The complete cycle of life is not limited to respiratory process of animals but in its portion takes a number of parallel paths, providing further sources of production of carbon dioxide and moisture necessary for plants as the basic raw materials of photosynthesis process. In fact, microbe organisms of the soil taking part in decomposition of organic materials in the soil are considered to be one of the main sources of production of carbon dioxide available to the plants. In conventional cropping techniques the condensation and evolution of carbon dioxide is primarily a result or function of the supply and rate of decomposition of organic material of whatever source contained in the soil, particularly plant and animal refuse such as manure.

Realization or understanding of the nature of the basic chemical reactions, climatic and soil relationship and salient plant physiological processes brought within the last half century into agricultural use, in addition to various organic fertilizers such as manure, also various chemical products in the form of fertilizers such as nitrogenous fertilizer elements; carbon dioxide, per se; as well as certain insecticides; herbicides and defoliants derived from nitrogen or carbon or both, which under present conditions must be purchased commercially by the crop producer. As an example, in the Southeast alone, the aspect of crop production costs ranges from $9.00 to $65.00 per acre for cotton and $9.00 to $21.00 per acre for corn, with other crops bracketed between these two sets of figures, all of the above figures being based on costs and conditions as they existed in 1948.

The above figures relate only to chemicals which are produced on a commercial scale, brought into a form convenient for storing and distribution, delivered to the point of application, diluted or dispersed in application to the concentrations permitting or ensuring their assimilation by the crop, all at prices comparable with those of natural fertilizers, or at the expense smaller than the value of the resulting advantages. On the other hand, processes or steps inherent in commercial production and distribution of such products make a large number of chemicals that could be exceedingly useful in application to crops prohibitive in cost and impracticable for wide agricultural use.

While the number of chemicals now used in the field and commercially established is constantly growing, it still is relatively small. By far the larger number of various substances useful in crop production cannot be utilized economically in the field. This fact is due in large part to the necessity of not only producing such substances, but first concentrating them for the purposes of more economical storage and transportation, packaging and distributing them with accompanying sales, transportation, and storage expenses, and thereupon bringing them for application into concentrations weak enough to permit their assimilation by crops. These and similar steps determine the cost of such substances at the point of application, and in many instances make use of many would-be useful substances in the field prohibitively costly, and, therefore, not feasible commercially.

This is true not only with respect to substances collaterally useful in the production of crops, such as various nitrate derivatives and minerals, but even with respect to carbon dioxide or carbonic acid, in spite of the realizations that when nuitritive minerals are not in short supply to a crop, carbon dioxide is usually the limiting constituent that controls the rate of growth of crops under most field conditions. As a result, in spite of many theoretical advances in agriculture, the production of crops is proceeding along lines of very low efficiency and effectiveness, with the end results being far below those that could be realized if costs of many synthetic substances useful in crop production were radically reduced and their handling and application facilitated in a very substantial degree.

One of the objects of the present invention is to provide an improved process and apparatus for carrying out such process whereby the difficulties and disadvantages explained are overcome and largely eliminated.

Another object of the present invention is to provide an improved process and an apparatus for carrying out said process, whereby crop production is greatly improved by the use of chemicals vital to the stimulation of growth of plants, which chemicals are made available at the point of application at a greatly decreased cost by eliminating the items of cost of such chemicals which are inherent in their commercial manufacture and distribution, and thus making their use practicable and economically advantageous.

A still further object of the present invention is to provide an improved process and apparatus for carrying out such process, whereby many chemicals vital in production of crops may be produced or synthesized at the point of their application, that is, directly on a farm and, moreover, produced at the time of their application, and may be produced while carrying on other operations forming part of crop production.

A still further object of the present invention is to provide an improved process and apparatus for carrying out the same, whereby a number of chemicals vital in production of crops and heretofore produced industrially and purchased by farmers, can be produced not only directly on the farm, but produced in or near concentrations suitable for assimilation by plants, and dispersed as they are produced, thereby eliminating the necessity of concentrating such products for the purposes of storage and distribution, as well as diluting them to concentrations necessary for their application.

A still further object of the present invention is to provide an improved process and apparatus for carrying out the same, whereby a number of vital chemicals usable in farm crop production are produced or synthesized on the farm from the exhaust gases of internal combustion engines and particularly tractor engines and, therefore, from raw material which is now uselessly discharged into the atmosphere.

A still further object of the present invention is to provide an improved process and apparatus for carrying out the same, whereby a number of chemicals useful in crop production are synthesized from exhaust gases of agricultural tractors while performing various operations such as plowing, cultivating and the like, and applied to the soil or to plants as they are produced with the aid of the same tractor.

A still further object of the present invention is to provide an improved process and apparatus for carrying out the same, whereby a number of important chemicals are synthesized from exhaust gases of a tractor engine in the process of performing other crop producing operations, which chemicals are applied to the soil or to the plants to stimulate crop growth and/or to aid in the dissolution of chemicaly bound nutritive elements in the soil, and/or aid in buffering the pH of certain types of soils, i.e. to increase or decrease their acidity or alkaline character, and/or defoliate certain crops when desirable, and/or control certain species of insects and varieties of some vegetation.

A still further object of the present invention is to provide an improved process and apparatus for increasing the available supply of carbon dioxide to the synthesizing tissues of plants in the concentrations and in the form assimilatable thereby, as well as for synthesizing ammonia and many of its derivatives, such as nitric oxide, nitric acid, and other nitrogen compounds desirable in the production of crops, thus fixing the nitrogen and eliminating the necessity of securing fixed nitrogen compounds from conventional commercial sources at their present costs.

A still further object of the present invention is to provide an improved process and apparatus for synthesizing from exhaust gases of a tractor engine with supplementary air or constituents thereof, water and/or its components, and, if desired, with the addition of raw materials or minerals in their initial state as mined, to produce a number of chemical compounds useful in crop production.

It is an added object of the present invention to provide an agricultural tractor having means for carrying out processes of the nature specified above, which means are relatively simple in construction, dependable in operation, and are relatively inexpensive to manufacture, to operate in the field, and to service.

Further objects and advantages of this invention will be apparent from the following description and appended claims, reference being had to the accompanying drawings forming a part of this specification, wherein like reference characters designate corresponding parts in the several views.

FIG. 9 is a diagram illustrating apparatus for synthesizing and dispensing ammonia, nitric acid, ammonium nitrate, urea, water solution of carbonic acid, with said products being synthesized and dispensed selectively, i.e. one by one, or in certain desired combinations.

Figure 1:
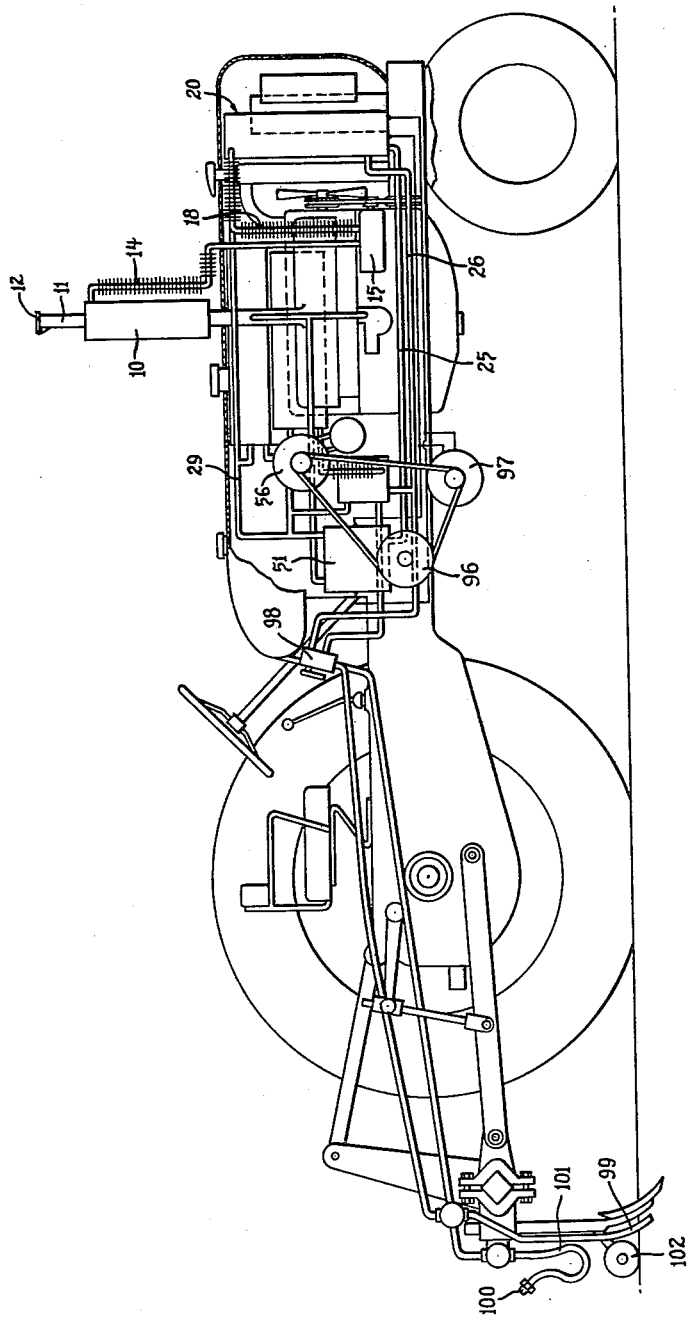
FIG. 1 is an elevational view of a tractor embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the present invention I discard the former practice of discharging exhaust gases of the engine of a tractor into the atmosphere as waste. In accordance with the invention such gases are retrieved and utilized as valuable starting material in greatly improving the production of crops and preparation of soils therefor. As the first phase of my process, I separate the exhaust gases into their main constituents, such as carbon dioxide, carbon monoxide, water, and nitrogen. Such separation may be preceded by the steps of intial cooling of the exhaust gases, compressing them and cooling the compressed gases again from their compressed temperatures. By such a procedure I facilitate further handling and separation of the gases. The separation process may be carried out with the aid of various means and methods, such as by gravity, i.e. self-settling; centrifugal separation or enhanced gravity; packing beds and ceramic tubes; scrubbing action, such as passing gases through venturi; impingement such as causing the gas particles to strike against some object with passing of lighter particles and detention of heavier ones; sonic separation, such as use of sound or other ways to cohere or collect certain substances, electrostatic precipitation or collection of particles by utilizing their static charge potential. Obviously, many other methods and various combinations of such methods may also be used.

After separation, any or all constituents so separated, or any combination thereof, with or without the addition of other materials which may be carried by the tractor, are utilized to synthesize or produce various products useful in crop production, which products may be applied to the soil and/or to the growing crop continuously, i.e. as they are produced. Obviously, such operations may be carried out while the tractor is performing another operation, such as plowing or cultivating, or such operations may be carried on for the specific purposes explained above.

The invention contemplates particularly, separation of carbon dioxide gas and dispensing it to the soil where it combines with the moisture thereof for retention in the soil, or after mixing such carbon dioxide with water and dispensing the solution to the foliage of growing crops. The water necessary for such application may be either especially provided, or condensed from the water vapor contained in the exhaust gases, or both. By virtue of this particular process I, in effect, supply the raw materials which are the basis of the photosynthesis process carried on by the living plants.

Moreover, by separating out of the exhaust gases the nitrogen contained therein, I thus provide a basis for ammonia synthesis to be carried on by the tractor as it operates in the field, as well as for synthesis of a number of many other nitrate derivatives useful in crop production. In such operations my process contemplates utilization of water separated out from the exhaust gases, and decomposing it by electrolysis into oxygen and hydrogen, using either both hydrogen and oxygen in the process of such synthesis, or using only the hydrogen and returning the free oxygen to the engine to improve combustion of fuel therein. Similarly, carbon monoxide gas may also be separated from the exhaust gases and returned to the engine for further oxidation, i.e. burnings. Synthesis of urea may be particularly advantageous with the use of my process and apparatus. Ammonia may be dispensed to the soil subterraneously for combining with the moisture thereof and retention in the soil. Urea produced in the form of vapor may be condesed and dispersed also to the soil with the aid of the tractor.

A number of other products useful in crop production may also be produced by the tractor embodying my inventon and working in the field, which products may be produced either solely from the separated constituents of the exhaust gases, or be produced with the addition of other materials, a supply of which may be carried by the tractor for such purposes. Various insecticide and herbicide compositions may also be produced in accordance with the invention for controlling insects and parasitic plants. The dispensing means carried by the tractor may dispense the products so produced selectively to the soil at any desirable depth, to the foliage, or to the roots of the plants. Any desired combination of dispensing proportions and means may be employed.

It will be understood that the advantages of my invention are realized to a greater degree when separation of the exhaust gases, synthesis of the products produced with the use of such gases, application of such products to the soil, and/or to the growing crop, are all done while the tractor is operating in the field, and, particularly, performing some conventional operation such as plowing, cultivating and the like. It will be understood, however, that the invention is not limited to coincidence of all of the above conditions, and that the invention is advantageous also when the tractor is operated solely and specifically for the purposes of utilizing its exhaust gases for synthesis of any of the products produced with the use of its exhaust gases. It will also be understood that inasmuch as the problem of transportation or long term storage of the products so produced may not exist or exist only in a negligible degree on a farm, the present invention is advantageous in its application also where the tractor is stationary and its engine is operating various appliances and machines, such as stationary threshing machine and the like. Under such conditions the exhaust gases may be utilized for synthesizing useful products which may be collected in special receptacles and used later. Under certain conditions it may also be advantageous to operate the tractor engine solely for the purposes of synthesizing certain products for later use on the farm. For instance, a tractor embodying the present invention may be run for awhile to produce a certain quantity of carbon dioxide and circulating such gas through a tank of water to produce a solution of carbonic acid of desired concentration, which solution may then be applied to growing crops or to the soil in any suitable manner such as through a special irrigation installation.

Figure 3:
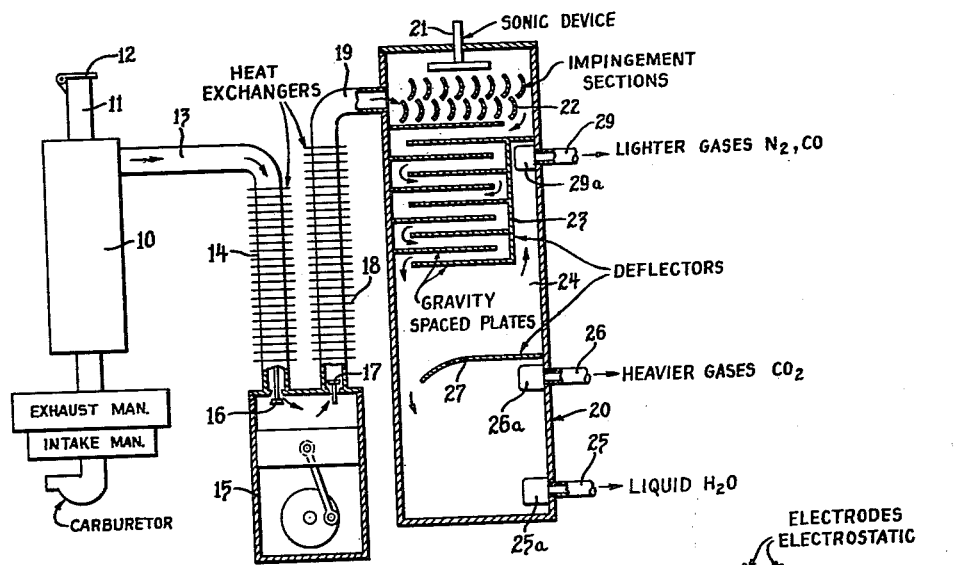
FIG. 3 is a diagram illustrating the apparatus for separating exhaust gases into their main constituents, with said apparatus including means for preliminary cooling of the gases, their compression and subsequent cooling prior to separation.

Referring specifically to FIG. 3, the apparatus illustrated therein shows a tractor engine muffler 10 with the exhaust pipe outlet 11 thereof normally closed with the aid of a hinged cap 12 to prevent rain entering the exhaust system. In the present embodiment of the invention, the hinged cap 12 also serves as a valve to prevent entry of atmospheric air into the exhaust system and into other parts of the apparatus where it may not be desired as interfering with the processes taking place therein.

The exhaust gases are removed from the exhaust system of the tractor through the conduit 13 having provided therein heat exchanger 14 which may be of any suitable construction such as in the form of a conduit provided with fins. From the heat exchanger 14 the gases pass through the compressor 15 provided with suitable valves 16 and 17. From the compressor 15 compressed gases are passed through the second heat exchanger 18, and through the conduit 19 into the separator device generally indicated by the numeral 20.

It will be understood that in passing through the heat exchanger 14, the exhaust gases, which may be at considerable temperature, such as 300–350 F., are cooled down to increase their density and to facilitate their handling by the compressor. It can be appreciated that cooling the exhaust gases by the heat exchanger 14 also reduces their volume and, therefore, pressure. This condition is enhanced further by the pumping action of the compressor 15. Thus, building up of back pressure in the muffler 10 of the engine is prevented, and the back pressure therein remains substantially the same as it would be if the exhaust gases were free to escape into the open atmosphere. Thus, no loss of engine power or stalling of the engine, particularly at lower speeds, results from retrieving the exhaust gases. This particular feature is of great practical importance in any means directed to the objects of the present invention.

It is also of importance that treatment of exhaust gases also includes their cooling after compression and separation into constituents since otherwise production of any of the useful compounds would not be practicable.

As the gases are compressed, their temperature rises again depending upon the pressure attained. As the compressed gases pass through the heat exchanger 18, much of the heat imparted to the gases in the process of compression is again taken out, and the cooled compressed gases proceed toward the separator 20.

The separator 20 illustrated in FIG. 3 is of a combined type, and it includes a sonic device 21, and impingement sections 22, operation of both of such devices causing formation of larger particles. After having passed by the sonic device 21 and impingement sections 22, the gases proceed through the gravity separation deflectors 23 and enter the chamber 24 in which separation is completed, the water collecting at the bottom of the chamber for withdrawal through the pipe or conduit 25, the intake of which is covered with a ceramic tube 25a adapted to pass only the water. The pipe or conduit 26 disposed at a higher elevation under the baffle plate 27 and provided with a ceramic pipe 26a adapted to pass only gas, is used for removing the heavier gas, namely, carbon dioxide collected under the baffle plate 27. The lighter gases, namely, nitrogen and carbon monoxide which have approximately the same weight, are collected at the upper portion of the chamber and are removed with the aid of a pipe 29 which may also be provided with a ceramic tube or cap such as 29a.

The gases so separated may then be conveyed to any desired destination for further use in accordance with the present invention. It will be understood that the water collecting at the bottom of the separator 20 will have carbon dioxide gas dissolved in it to its virtually maximum capacity determined by the temperature and the pressure. Therefore, such water may be used for dispersion as carbonic acids, or be mixed with more water if a weaker solution is desired. On the other hand, when this water is desired to be used for other purposes, such as electrolysis, it may be freed from carbon dioxide by heating or in any other practicable manner.

Figure 4:
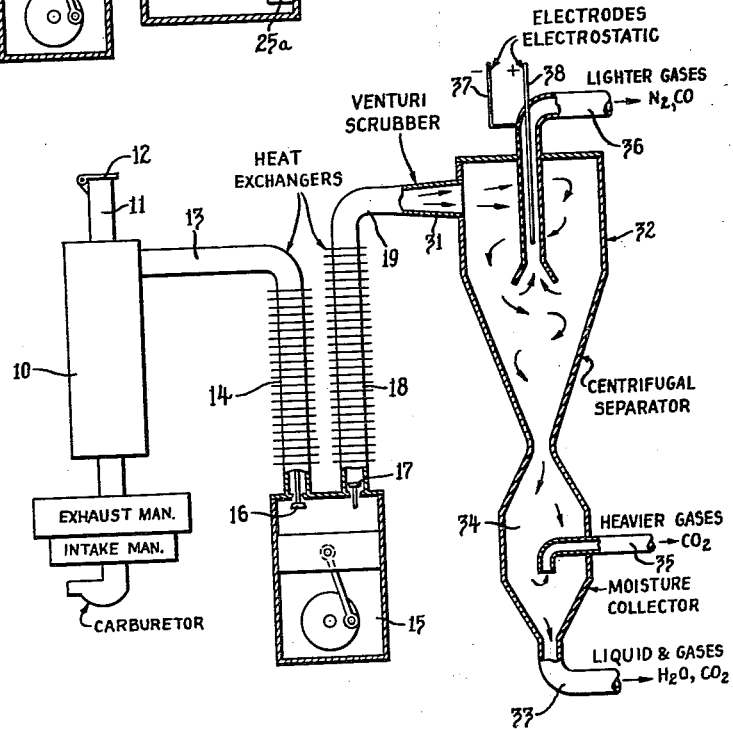
FIG. 4 is a diagram similar in part to FIG. 3, the separator apparatus being of a modified construction.

The apparatus of FIG. 4 is similar in part to that of FIG. 3, and its exhaust gases receiving and compressing means are substantially the same as those shown in FIG. 3, and, therefore, the same numerals are used in their designation. However, the conduit 19 has at its delivery end a venturi scrubber, designated by the numeral 31, for the purpose of stimulating growth of particles. The separator, designated generally by the numeral 32, is of the centrifugal type and is adapted to separate the moisture at its lowermost point for removal through the pipe 33, with heavy carbon dioxide being removable from the chamber 34 through the pipe 35, with the lighter gases, particularly nitrogen and carbon monoxide, being removable from the higher portion of the separator through the pipe 36. In order to reduce carrying out of moisture with lighter gases, electrostatic means such as electrodes 37 and 38 may be used at the receiving end of pipe 36 in a manner well known in the art. These and any other suitable separator means, or any combination thereof, may be used.

Figure 5:
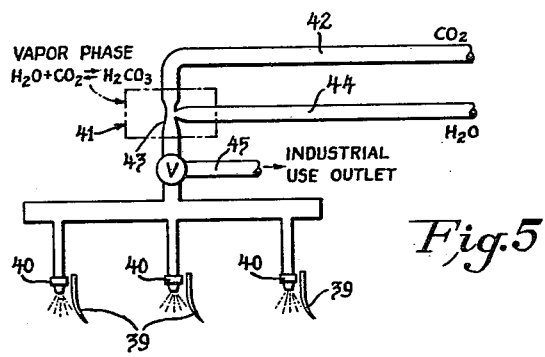
FIG. 5 illustrates a nozzle device for producing solution of carbonic acid and dispensing the same to the crop or to the soil.

FIG. 5 illustrates dispensing nozzle devices which may be used to dispense gases or liquids such as various solutions, either to the aerial organs of crops or subterraneously, that is, directly to the soil. In subterraneous dispersion, the furrow-making fingers 39 will precede the nozzles 40 in their movement in the soil. FIG. 5 illustrates the use of such dispensing nozzles for dispensing solution of carbonic acid, the same being made in the venturi mixing device generally designated by the numeral 41. In such a device, the carbon dioxide flowing from the pipe 42 through the venturi 43 sucks in water from the pipe 44 in a manner well known in the art. It will be understood that the same dispensing nozzle device may be used for mixing other gases or liquids or any combinations thereof. An industrial use outlet, such as one indicated at 45, controlled with a suitable valve may also be provided.

Figure 6:
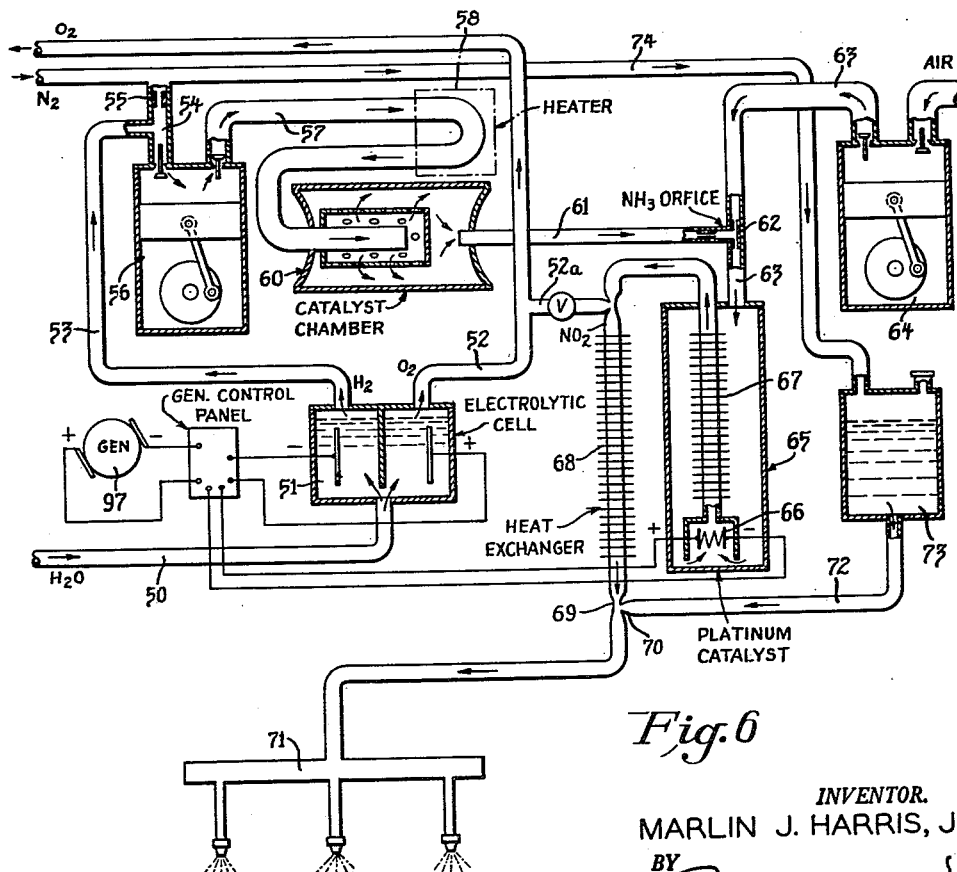
FIG. 6 is a diagrammatic view illustrating apparatus for synthesizing and dispensing solution of nitric acid, showing of separation means being omitted.

FIG. 6 illustrates an apparatus, exclusive of the separator which may be of any suitable kind such as those shown in FIGS. 3 and 4, for synthesizing nitric acid and dispersing the same in the form of a weak water solution. As shown in FIG. 6, the water received from the separator passes through the pipe 50 to the electrolysis device 51 for separation in a manner well known in the art, into hydrogen and oxygen. Oxygen is taken out through the pipe 52 and disposed in any desired manner, such as by returning it to the engine or for use in any other application or process. Hydrogen is removed with the aid of a pipe 53 and is conveyed to the mixing pipe 54 in which there is also provided a metering orifice 55 through which nitrogen is drawn in desired proportion. The mixture of hydrogen and nitrogen thus produced in the mixing pipe 54 is drawn into the pump generally designated by the numeral 56 and shown in the drawing in the diagrammatic manner. It is desirable, to have the pump 56 in the form of a multiple stage pump provided with means to separate the carbon monoxide gas for removal and disposal in any desired manner. Constructions of such pumps which in this as well as in other parts of my apparatus may be of reciprocating, centrifugal, or rotary displacement types, or any combination thereof, are well known in the art and need not be described here in further detail.

The mixture of hydrogen and nitrogen, relieved from carbon monoxide and brought to the desired pressure and higher temperature, is passed through the pipe 57 and through the heater designated by the numeral 58 to bring it to a still higher temperature. Thereupon, such heated mixture is passed through the catalyst chamber generally designated by the numeral 60. Construction of such catalyst chambers is well known in the art, and a chamber of any desired construction may be employed herein. The function of the catalyst chamber is to effect chemical reaction between the hydrogen and nitrogen to produce anhydrous ammonia.

Ammonia produced as described above passes through the pipe 61, metering orifice 62, to the air pipe 63 into which air is supplied with the aid of an air pump generally designated by the numeral 64. The mixture of ammonia and air in proper proportions is thereupon passed through the second catalyst chamber 65 wherein it passes over a platinum catalyst 66, and, thereupon, through a heat exchanger 67 to remove excess heat. The heat exchanger 67 may be arranged as shown in the drawing in the path of the gases flowing from the pipe 63 for the purpose of preheating such gases before they reach the platinum catalyst, and to remove excess heat after they pass such catalyst. In the process of passing through the catalyst chamber 65, nitric oxide is formed. When additional oxygen is added to nitric oxide with the aid of a conduit 52a, nitrogen dioxide is formed. If desired, the nitrogen dioxide can be cooled by the second heat exchanger 68. The nitrogen dioxide so produced, thereupon passes through venturi 69 which is adapted to draw in through the jet 70 the desired amounts of water broken to mist by the action of such jet to produce nitric acid for dispersion through the nozzle device generally indicated by the numeral 71. The dispersion of the nitric acid may be either subterraneous or it may be applied directly to the plants' aerial organs.

The water to the nozzle device 71 is supplied by the water pipe 72 connected to the water reservoir 73. It is desired to have water in the tank 73 heated, and such heating may be done with the aid of a coil, hot gas jacket, or in any other suitable manner. In providing such heating means, the waste heat of exhaust gases may be utilized, which may be very efficiently done by cooling such exhaust gases prior to their separation by providing the heat exchanger, such as exchanger 14 of FIG. 3, around said water tank 73. In order to produce sufficient pressure within the tank 73 for passing the water to the nozzle device 70 and ejecting it therefrom, such pressure may be conveyed to the tank through a suitable conduit from the separator. In the embodiment illustrated this is effected with the aid of a pipe 74 conveying to the tank 73 the pressure existing in the pipe carrying nitrogen to the pump 56. Obviously, when higher pressure is desired, it may be conveyed to the tank 73 from other portions of the apparatus having higher pressures. Tank 73 also provides a convenient means for imparting to the solution any desired mineral or other substance that is soluble in water and dilute nitric acid. Such substances may also be used for a variety of processes depending on conditions and requirements of the soil and of the crop.

Figure 7:
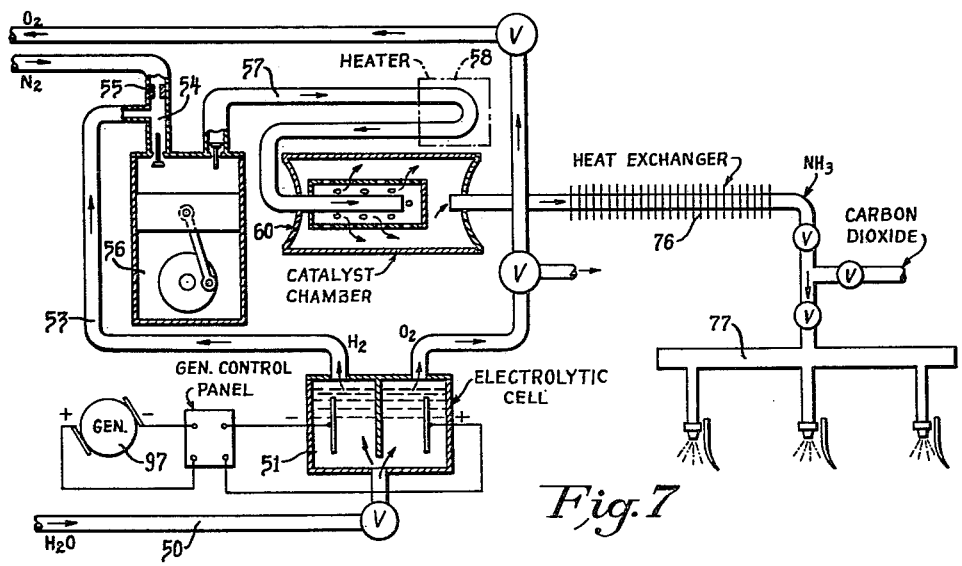
FIG. 7 is a diagrammatic view illustrating apparatus for synthesizing and dispensing ammonia, showing of separation means being omitted.

FIG. 7 illustrates, in effect, a portion of the apparatus shown in FIG. 6 and utilizing the anhydrous ammonia for direct dispersion without any further synthesis. For such use, the anhydrous ammonia is cooled in the heat exchanger 76 from where it proceeds to the dispensing nozzle device 77 for subterraneous dispersion. The nozzle 77 may have an outlet provided with a suitable coupling and a valve for industrial use of anhydrous ammonia, or to have the device adapted for alternative uses such as for dispersion of other products, such as carbon dioxide.

Figure 8:
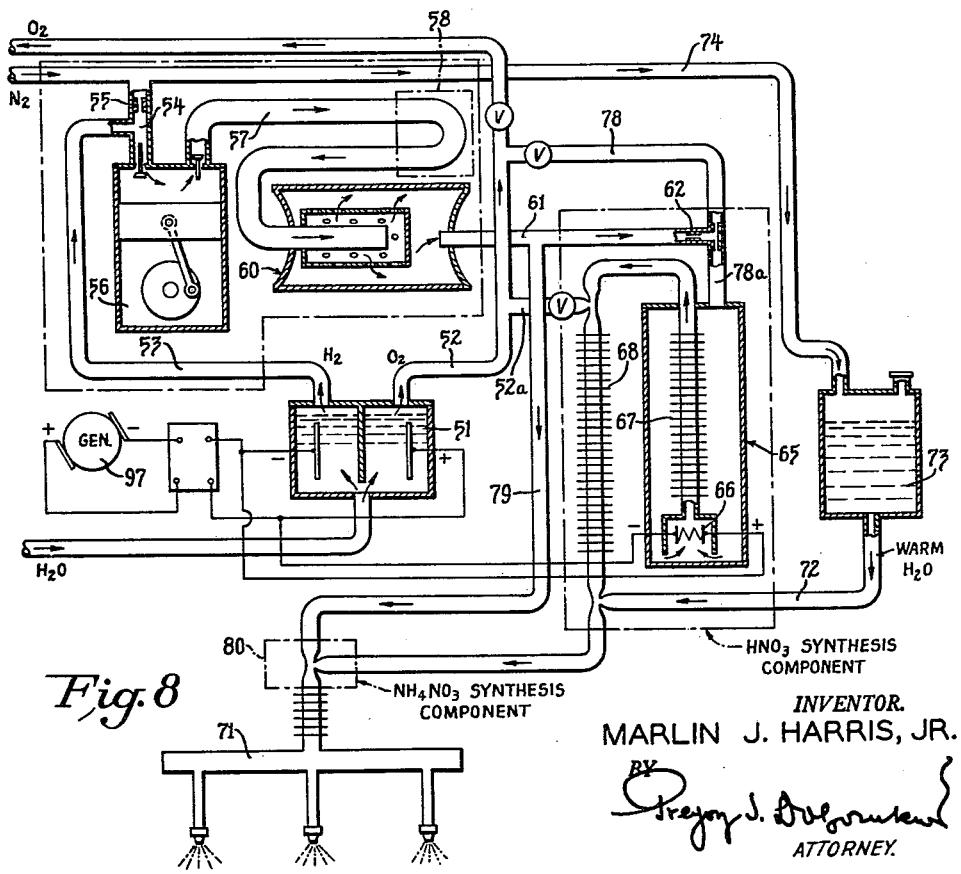
FIG. 8 is a diagram illustrating apparatus for synthesizing ammonium nitrate and dispensing the same, showing of separation means being omitted.

FIG. 8 illustrates an apparatus which includes as its part substantially the entire system illustrated in FIG. 6 with the exception of the air separating pump 64. In the apparatus of FIG. 8, instead of supplying air with the aid of a pump, part of the oxygen produced in the electrolytic device 51 is conveyed through the pipe 78 to the mixing pipe 78a and is thus returned to the catalyst chamber 65. Moreover, after producing dilute nitric acid, additional anhydrous ammonia is received from the pipe 61 and is conveyed through the pipe 79 to the metering mixing chamber 80 for mixing the dilute nitric acid and ammonia to produce ammonium nitrate for dispersion either subterraneously or to the aerial organs of the plants. Application of such particular compound has a number of important advantages, detailed explanation of which is not believed necessary for the purpose of the present invention.

It will be understood that in providing practical installation, for the purpose of improving efficiency of the system, a heat exchanger extracting heat from various substances may be utilized for heating air or other substances the temperature of which has to be increased in accordance with the requirements of paricular processes. Such combining of heat exchangers is to be done to raise temperatures to desired point and thus to increase efficiency of the devices involved, and is done having in view the desired end results.

FIG. 9 illustrates a more universal system which combines in itself as its parts, systems described above and used selectively in any desired manner, and also includes means for production of synthesis of urea, and of insecticide, fungicide and herbicide preparation, such as various chlorine, carbon and nitrogen toxic derivations. Synthesis of urea is effected by the provision of a mixing pipe 90 adapted to carry the mixture of carbon dioxide and water vapor from the heated chamber 91 of the separator and to transfer such mixture to the combined mixing chamber and heat exchanger 92 into which anhydrous ammonia is also supplied through the pipe 93. The heat exchanger is intended to bring the temperature of the mixture to approximately 150° C. for formation of urea, which is thereupon conveyed to the nozzle device 94 for any desired dispersion, subterraneous or directly to the aerial organs of the plants, or both.

Figure 2:
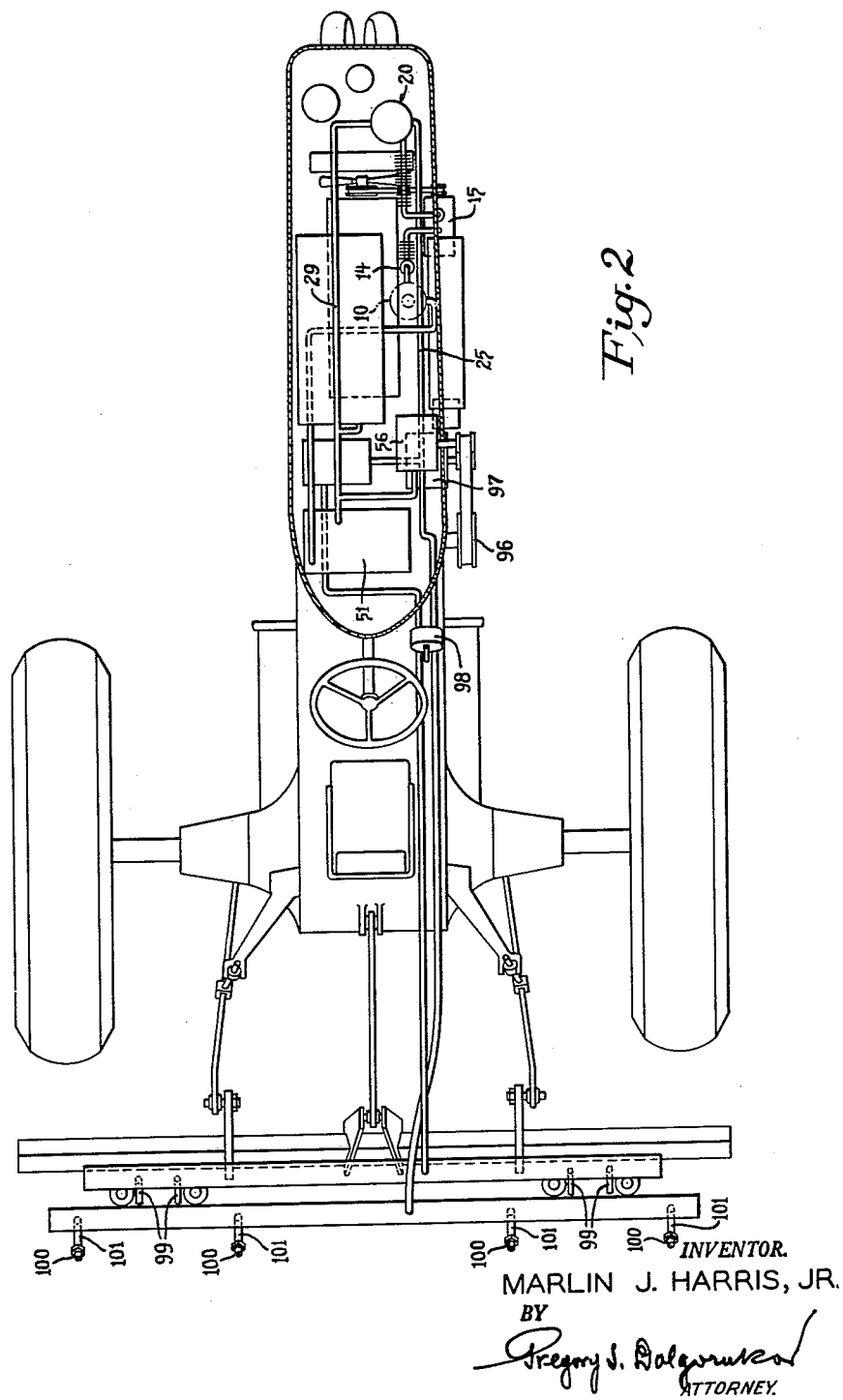
FIG. 2 is a top view of the tractor of FIG. 1.

In view of the above disclosures describing the apparatus from its functional standpoint, FIGS. 1 and 2 can now be described in greater detail. FIGS. 1 and 2 show exemplary installation in which a system such as one illustrated in FIG. 9 is combined with the structure of a tractor. These figures illustrate in a general way the space relationship of the various portions of the device and of the tractor construction. Referring specifically to FIGS. 1 and 2, the engine muffler 10, the heat exchangers 14 and 18, the compressor 15, and the separator chamber 20 may be easily recognized, as well as the nitrogen conduit 29 leading to the multiple stage pump 56. The multiple stage pump 56 may be operated from the power sheave 96 also operating the generator 97 of the tractor. The control box 98 is provided to control dispersion of various substances with the aid of separate nozzle devices. A subterraneous nozzle device 99, and an aerial nozzle device 100 provided with a flexible section 101 for adjusting its height to suit conditions of application, may be mounted on the tractor as shown. A sealing roller 102 is provided behind the subterraneous nozzle 99 to seal the openings in the soil formed therein in the process of dispersion, and thus to prevent waste of dispersed substances and to ensure their better retention in the soil. It will be understood that various other mechanisms or devices for facilitating operation of the device or installation thereof, such as brackets, clutches and so on, as well as control means, may be provided in the system for convenience of installation and operation.

Synthesis of insecticides and herbicides, particularly chlorine, nitrogen, and carbon dioxide preparations, may also be easily effected with the aid of my improved apparatus. This may be done by using the components of exhaust gases and addition of salts such as potassium chloride and sodium chloride and electrolyzing such substances in electrolytic chamber. The chlorine gas formed in such a manner may be combined with other products of combustion such as carbon monoxide by recycling it through the engine to produce a number of very effective insecticides. By dispersing carbon dioxide with such insecticides, respiration of insects may be stimulated to increase the effectiveness of the insecticide process.

There is thus provided an improved method and apparatus, whereby the objects of the present invention listed above and numerous additional advantages are attained.

I claim:

1. The process of aiding growth of plants growing in the open air, said process including the steps of retrieving exhaust gases from the engine of a tractor while said tractor is delivering power for a conventional agricultural use, retrieving such gases being done with holding the back pressure in the engine down substantially to its free exhaust pressure, continuously separating said exhaust gases, as they are produced, into their constituents, and utilizing at least one of such constituents, substantially immediately after its separation, for application to the plants.

2. An agricultural process intended to aid in production of field crops growing in the open air, said process including the steps of continuously retrieving exhaust gases from the engine of a tractor while said tractor is movably operating in the field, continuously separating out of said gases at least a portion of carbon dioxide, and continuously utilizing the separated carbon dioxide following its separation in an operation forming a part of crop production.

3. An agricultural process including the steps of continuously separating out of exhaust gases from the engine of a tractor at least a portion of carbon dioxide contained therein, and continuously applying the separated carbon dioxide to the soil with the use of the tractor.

4. An agricultural process including the steps of retrieving exhaust gases from the engine of a tractor, continuously separating out of said gases at least a portion of carbon dioxide contained therein, dissolving the carbon dioxide in water, and continuously applying the solution with the aid of the tractor at least to the foliage of a growing crop.

5. An agricultural process including the steps of retrieving exhaust gases from the engine of a tractor, continuously separating out of such gases carbon dioxide gas and water contained therein, dissolving at least a portion of the carbon dioxide in the water, and continuously and selectively applying said carbon dioxide as gas and in the water solution to the soil and to the foliage of a crop with the aid of the tractor.

6. In a tractor including an internal combustion engine exhausting gases of combustion, pumping means adapted to retrieve said gases without increasing appreciably their back pressure, means associated with said pumping means and carried by said tractor to separate out of said gases at least a portion of carbon dioxide contained therein, and conduit means carried by said tractor to dispense such carbon dioxide with the aid of the tractor to the soil.

7. In a tractor including an internal combustion engine exhausting gases of combustion, means carried by the tractor and continuously retrieving said exhaust gases while the tractor is movably operating in the field, said retrieving being attained with holding the back pressure in the engine down substantially to its free exhaust pressure, means continuously separating out of the retrieved exhaust gases at least a portion of carbon dioxide contained therein, and means continuously utilizing the separated carbon dioxide for production of carbon derivatives useful in crop production operations.

8. In an agricultural tractor including an internal combustion engine exhausting gases of combustion, means to separate out of said gases at least a portion of carbon dioxide and water contained therein, mixing carbon dioxide with the water to produce carbonic acid of desired concentration, and dispensing said carbonic acid selectively to the soil, and to the foliage and to the roots of a growing crop.

9. In an agricultural tractor including an internal combustion engine exhausting gases of combustion, means carried by said tractor to separate out of said gases at least a portion of carbon dioxide contained therein, and conduit means carried by said tractor to dispense such carbon dioxide with an insecticide.

10. An agricultural process including the steps of retrieving exhaust gases from the engine of a tractor, while said tractor is delivering power for a conventional agricultural use, the retrieving being done with holding the back pressure in the engine down substantially to its free exhaust pressure, continuously separating out of said gases at least a portion of nitrogen contained therein, mixing the nitrogen with hydrogen for producing of ammonia, and dispensing the ammonia so produced to the soil for becoming dissolved in the moisture thereof and retention in the soil.

11. An agricultural process including the steps of retrieving exhaust gases from the engine of a tractor while said tractor is delivering power for a conventional agricultural use, the retrieving being done with holding the back pressure in the engine down substantially to its free exhaust pressure, continuously separating out of said gases at least a portion of nitrogen and water contained therein, decomposing the water by electrolysis into hydrogen and oxygen, utilizing the nitrogen and the hydrogen to produce ammonia for continuous dispersion into the soil.

12. The invention defined in claim 11, and including returning the oxygen to the engine for improving combustion.

13. An agricultural process including the steps of retrieving exhaust gases from the engine of a tractor while said tractor is delivering power for a conventional agricultural use, the retrieving being done with holding the back pressure in the engine down substantially to its free exhaust pressure, continuously separating out of said gases at least a portion of nitrogen and water contained therein, decomposing the water into hydrogen and oxygen, utilizing the nitrogen and the oxygen in desired proportions to produce ammonia for continuous dispersion into the soil, and nitric acid for dispersion selectively to the foliage and to the roots of a growing crop.

14. An agricultural process including the steps of retrieving exhaust gases from the engine of a tractor while said tractor is delivering power for a conventional agricultural use, the retrieving being done with holding the back pressure in the engine down substantially to its free exhaust pressure, continuously separating out of said gases at least a portion of nitrogen and water contained therein, decomposing the water by electrolysis into hydrogen and oxygen, utilizing the nitrogen and the oxygen to produce a mixture of nitrogen and oxygen, passing the mixture through copper electric arc to form nitric oxide, adding more oxygen and water to the nitric oxide to produce nitric acid in desired concentration, and dispersing the nitric acid selectively to the foliage and to the roots of a growing crops.

15. In an agricultural tractor including an internal combustion engine exhausting gases of combustion, means to separate out of said gases while the tractor is delivering power for a conventional agricultural use, and with holding the back pressure in the engine down substantially to its free exhaust pressure at least a portion of nitrogen contained therein, means utilizing such nitrogen for production of ammonia, and means for dispensing the ammonia, as the same is produced, to the soil.

16. In an agricultural tractor including an internal combustion engine exhausting gases of combustion, means to separate out of said gases while the tractor is delivering power for a conventional agricultural use, and with holding the back pressure in the engine down substantially to its free exhaust pressure at least a portion of the nitrogen and of the water contained therein, means to decompose the separated water by electrolysis into hydrogen and oxygen, means to produce ammonia from the nitrogen and the hydrogen, and means for dispensing the ammonia, as the same is produced to the soil.

17. In an agricultural tractor including an internal combustion engine exhausting gases of combustion, means to separate out of said gases while the tractor is delivering power for a conventional agricultural use, and with holding the back pressure in the engine down substantially to its free exhaust pressure at least a portion of the nitrogen and of the water contained therein, means to decompose the separated water by electrolysis into hydrogen and oxygen, means to produce ammonia and nitric acid from the nitrogen, hydrogen and oxygen so produced, and means for dispensing the ammonia and the nitric acid selectively to the soil and to the growing crop.

References Cited in the file of this patent

UNITED STATES PATENTS 1,121,722    Fessenden _____ Dec. 22, 1914

FOREIGN PATENTS 162,299    Great Britain _____ of 1924